(12) United States Patent
Young et al.

(10) Patent No.: US 12,169,548 B2
(45) Date of Patent: *Dec. 17, 2024

(54) ALTERNATIVE APPROACH TO THE GENERATION OF A UNIQUE RESPONSE TO A CHALLENGE

(71) Applicant: Quantum Base Limited, Stockport (GB)

(72) Inventors: Robert James Young, Stockport (GB); Ramon Bernardo Gavito, Stockport (GB)

(73) Assignee: QUANTUM BASE LIMITED, Stockport (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,430

(22) Filed: Apr. 9, 2024

(65) Prior Publication Data
US 2024/0265089 A1    Aug. 8, 2024

Related U.S. Application Data

(63) Continuation of application No. 17/594,963, filed as application No. PCT/GB2020/051161 on May 13, 2020, now Pat. No. 11,983,262.

(51) Int. Cl.
*G06F 21/44* (2013.01)

(52) U.S. Cl.
CPC ...... *G06F 21/44* (2013.01); *G06F 2221/2103* (2013.01)

(58) Field of Classification Search
CPC .................................................... G06F 21/44
See application file for complete search history.

(56) References Cited

U.S. PATENT DOCUMENTS

| 8,768,306 B1* | 7/2014 | Ben Ayed | H04W 12/069 |
| | | | 455/411 |
| 8,848,477 B2 | 9/2014 | Schrijen et al. | |

(Continued)

FOREIGN PATENT DOCUMENTS

| GB | 2543126 A | 4/2017 |
| WO | 2008015603 A1 | 2/2008 |

OTHER PUBLICATIONS

International Search Report for corresponding PCT Application No. PCT/GB2020/051161 dated Mar. 7, 2020, 3 pages.

(Continued)

*Primary Examiner* — Viral S Lakhia
(74) *Attorney, Agent, or Firm* — Hoffman Warnick LLC

(57) ABSTRACT

The disclosure provides a device for generating a unique response to a challenge, the device comprising: a plurality of structures, each structure being able to change from a first distinct state, to a second distinct state, in response to an appropriate input challenge; the device being arranged to facilitate a challenge of the plurality of structures in combination, by changing an input to the plurality of structures in combination, to cause each structure of the plurality of structures to change from the first distinct state, to the second distinct state; as part of the challenge, the device being arranged to facilitate a measurement of an output of the plurality of structures in combination, in response to the input; wherein the unique response is at least indicative of a sequence in which the change in state takes place for each of the plurality of structures, in response to the input.

16 Claims, 11 Drawing Sheets

(56) References Cited

U.S. PATENT DOCUMENTS

| | | | |
|---|---|---|---|
| 8,861,725 B2 | 10/2014 | Goettfert et al. | |
| 9,806,718 B2 | 10/2017 | Wallrabenstein | |
| 9,917,850 B2 * | 3/2018 | Ficarra | H04L 63/1441 |
| 10,402,557 B2 * | 9/2019 | Harjanto | G06F 21/44 |
| 10,454,922 B2 * | 10/2019 | Popoveniuc | H04L 63/1441 |
| 10,469,083 B2 | 11/2019 | Bury et al. | |
| 10,522,472 B2 * | 12/2019 | De Langen | H01L 23/544 |
| 10,790,994 B2 * | 9/2020 | Cambou | G02B 5/201 |
| 10,885,277 B2 | 1/2021 | Ravi et al. | |
| 11,106,975 B2 | 8/2021 | Lei | |
| 11,295,003 B2 * | 4/2022 | Bernardo Gavito | G06F 21/73 |
| 11,310,062 B2 | 4/2022 | Cambou et al. | |
| 2015/0270839 A1 | 9/2015 | Mucha et al. | |
| 2017/0134174 A1 * | 5/2017 | Cambou | G02B 1/002 |
| 2018/0013431 A1 | 1/2018 | Bury et al. | |
| 2018/0345904 A1 | 12/2018 | Moore et al. | |
| 2019/0345904 A1 | 11/2019 | Contardo et al. | |
| 2020/0050342 A1 | 2/2020 | Lee | |
| 2020/0177399 A1 * | 6/2020 | Speed | G06N 10/00 |
| 2020/0186368 A1 * | 6/2020 | Roberts | H04L 9/3278 |
| 2020/0210584 A1 * | 7/2020 | Ficarra | G06F 21/54 |
| 2020/0401874 A1 | 12/2020 | Kalchbrenner et al. | |
| 2021/0258174 A1 | 8/2021 | Schoinianakis et al. | |
| 2022/0166638 A1 | 5/2022 | Razi et al. | |

OTHER PUBLICATIONS

GB Search Report for corresponding GB Application No. GB1906847.7 dated Oct. 29, 2019, 3 pages.

\* cited by examiner

ALTERNATIVE APPROACH TO THE GENERATION OF A UNIQUE RESPONSE TO A CHALLENGE

The present invention relates generally to an alternative approach to the generation of a unique response to a challenge, and in particular to a related device and method for generating a unique response to a challenge.

Generating a unique response to a challenge is often important for a number of reasons. The unique response can be used to provide or check a unique identifier associated with a device that is challenged, for example for authentication purposes or for checking, using or establishing a cryptographic key or similar. Indeed, a cryptographic key might alternatively or additionally be defined or described as a unique identifier, this identifier being linked to or derived from a unique response to a device that is challenged in some way.

A device that provides such a unique response can be described as, or be described as comprising, providing or forming a unique, difficult to clone (physical) function. This function can easily and repeatedly be read, and so can be used to identify or authenticate the device, or an object which the device is connected to or forms a part of. A physical (sometimes referred to as physically) unclonable function is often referred to as a PUF.

Typically, a physically unclonable function is provided on the basis of what would commonly be described as macroscopic physical principles. For instance, a physically unclonable function may be based on minute changes in quartz crystal oscillation frequency between different crystals, or the different capacitances between different devices as a result of different thicknesses of layers constituting those different devices, or the identification of anomalies (e.g. dead cells) in an array of memory cells. There is little doubt that these approaches do work in practice, in some applications. However, they do, nevertheless, have disadvantages. In more recent years, it has been realised that physically unclonable functions may be based on quantum mechanical effects, for example quantum mechanical confinement. Such quantum physically unclonable functions offer advantages over macroscopic physically unclonable functions. However, existing approaches in both quantum and macroscopic physical unclonable functions mean that it is sometimes difficult to easily, readily and repeatedly generate a unique response to a challenge of a device (the device being or comprising the physically unclonable function). For example, in a macroscopic environment, it may be quite difficult to repeatedly, quickly and accurately determine changes in quartz crystal oscillation frequencies between different crystals, and to obtain the unique response and a related unique identifier Or, it may be difficult to quickly and easily measure different capacitances between different devices as a result of different thicknesses, and so on. In a quantum physical unclonable function, it may be difficult to quickly, and easily differentiate between peaks in input-output characteristics, those peaks being used to generate a related unique identifier.

While it is not impossible to overcome these problems, possible solutions might require more specialist equipment or approaches, increasing cost or complexity, or simply require more time or processing power to implement.

In example embodiments of the present invention, it is as example aim to at least partially avoid or overcome at least one disadvantage of the prior art, whether that advantage is identified herein or elsewhere, or to at least provide an alternative to devices and methods of the prior art.

According to the present invention, there is provided apparatus and methodology as set forth in the claims that follow. Other features of the invention will be apparent from the dependent claims, and from the description that follows.

According to an aspect of the invention, there is provided a device for generating a unique response to a challenge, the device comprising: a plurality of structures, each structure being able to change from a first distinct state, to a second distinct state, in response to an appropriate input challenge; the device being arranged to facilitate a challenge of the plurality of structures in combination, by changing an input to the plurality of structures in combination, to cause each structure of the plurality of structures to change from the first distinct state, to the second distinct state; as part of the challenge, the device being arranged to facilitate a measurement of an output of the plurality of structures in combination, in response to the input; wherein the unique response is at least indicative of a sequence in which the change in state takes place for each of the plurality of structures, in response to the input.

Each structure, or more than one structure challenged in combination, may exhibit non-linear behaviour in terms of an input-output characteristic. Optionally, the input-output characteristic may comprise a change in an input sequence versus a change in a sequence in which the change in state takes place for each of the plurality of structures, in response to the input.

The non-linear behaviour may be such that a change in an input according to a first input sequence, from a first level to a second level, results in a first sequence in which the change in state takes place for each of the plurality of structures, in response to the input; and such that a change in an input according to a second input sequence, back down from that second value to that first value, results in a second, different sequence in which the change in state takes place for each of the plurality of structures, in response to the input, and in which the second sequence is not simply a reverse of the first sequence.

The non-linear behaviour may be such that a change in an input according to a first input sequence, from a first level, to a second level, to a third level, results in a first sequence in which the change in state takes place for each of the plurality of structures, in response to the input; and such that a change in an input according to a second input sequence, from the same first level, to a fourth level, to the same third level, results in a second, different sequence in which the change in state takes place for each of the plurality of structures, in response to the input.

The structures may be nominally the same.

The device may be fabricated such that a single structure of the plurality of structures cannot be readily challenged in isolation.

The unique response may also be at least indicative of another property of an input-output characteristic of a structure, or more than one structure challenged in combination, other than the sequence in which the change in state takes place for each of the plurality of structures, in response to the input. Optionally, the another property may be at least indicative of a part of a shape of an input-output characteristic for a structure, or more than one structure challenged in combination.

The device may be arranged to facilitate a challenge of all structures in combination, or a selectable sub-set of the structures in combination.

The device may comprise a first part, comprising one or more of the structures, but not all of the structures, and a second part, comprising a remaining number of the structures, and the first and second parts are readily connectable and/or separable to selectively assemble or disassemble the device, allowing structures from the first and second parts of the device to be challenged in combination, or to prevent such combined challenge.

The first part may be located in a secure environment, relative to the location of, or the ability to locate, the second part of the device The first part (optionally only the first part) of the device may be arranged to facilitate the measurement of the output of the plurality of structures in combination, in response to the input.

The first part (optionally only the first part) of the device may be arranged to facilitate a check of whether the sequence in which the change in state takes place for each of the plurality of structures, in response to the input is an expected sequence.

The expected sequence may be when the first part and the second part are an intended or secure first part, and an intended or secure second part, and an unexpected response is when the first part and the second part are an unintended or unsecure first part, or an unintended or unsecure second part.

Each structure may be: an electrical component, to be challenged with an input and provide an electrical output in response to that challenge, optionally exhibiting negative differential resistance, optionally comprising a diode; or an optical component, to be challenged with an input and provide an optical output in response to that challenge; or a magnetic component, to be challenged with an input and provide a magnetic output in response to that challenge; or a mechanical component, to be challenged with an input and provide a mechanical output in response to that challenge.

According to an aspect of the invention, there is provided a method for generating a unique response to a challenge, the method comprising: challenging a plurality of structures in combination, by changing an input to the plurality of structures in combination, to cause each structure of the plurality of structures to change from a first distinct state, to a second distinct state; as part of the challenge, measuring an output of the plurality of structures in combination, in response to the input; wherein the unique response is at least indicative of a sequence in which the change in state takes place for each of the plurality of structures, in response to the input.

It will be appreciated that different features of different aspects may be used in combination with one another, and/or in place of one another.

For a better understanding of the invention, and to show how embodiments of the same may be carried into effect, reference will now be made, by way of example, to the accompanying diagrammatic figures in which:

FIG. 1 schematically depicts prior art apparatus for generating a unique response to a challenge;

FIGS. 2 and 3 are graphs depicting different unique responses to challenges obtained using the apparatus of FIG. 1;

FIG. 4 schematically depicts general principles associated with an approach to generating a unique response to a challenge, according to example embodiments of the invention;

FIG. 5 schematically depicts a device, challenge and response in accordance with an example embodiment;

FIG. 6 schematically depicts possible combinations of switching orders of structures of FIG. 5;

FIG. 7 schematically depicts a device, challenge and response according to a different example embodiment;

FIG. 8 schematically depicts possible combinations of switching orders of structures of FIG. 7;

FIG. 9 schematically depicts a device, challenge and response according to a different example embodiment;

FIG. 10 schematically depicts possible combinations of switching order of structures of FIG. 9;

FIG. 11 schematically depicts a potential practical implementation of principles associated with the present invention, in a first state;

FIG. 12 schematically depicts a potential practical implementation of principles associated with the present invention, in a second state;

FIG. 13 schematically depicts a device according to example embodiments, in combination with apparatus for detecting switching of structures in that device, according to example embodiments;

FIG. 14 schematically depicts a device according to example embodiments, in combination with apparatus for detecting switching of structures in that device, according to example embodiments;

FIG. 15 schematically depicts non-linear switching principles associated with embodiments of the invention;

Figure 19:
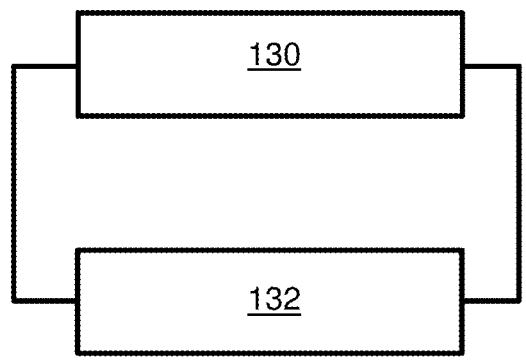
Figure 20:
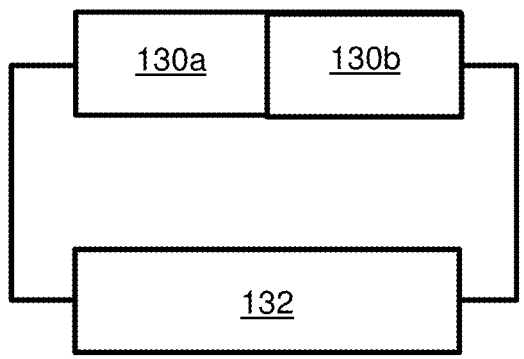
Figure 21:
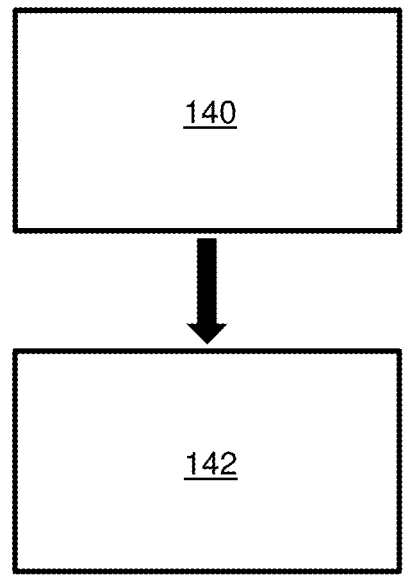

FIG. 19 schematically depicts general apparatus principles associated with example embodiments of the present invention;

FIG. 20 schematically depicts a variation on the apparatus principles shown in and as described with reference to FIG. 19, according to example embodiment; and FIG. 21 schematically depicts general method principles associated with embodiments of the present invention.

Figure 1:
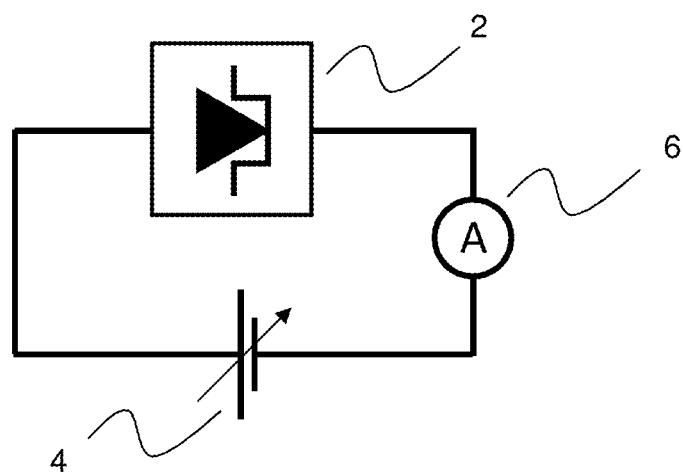

FIG. 1 schematically depicts prior art apparatus for generating a unique response to a challenge. The apparatus comprises a configurable array of resonant tunnelling diodes 2. This array functions as the physically unclonable function, discussed above. The array of diodes 2 may be challenged by appropriate control of an input voltage from a variable voltage source 4. An output current is measured by an ammeter 6. In this way, different voltages can be provided to a specific configuration of diodes of the array 2, and an output measured by the ammeter 6. A unique response can therefore be obtained, for example from a voltage-current characteristic.

Figure 2:
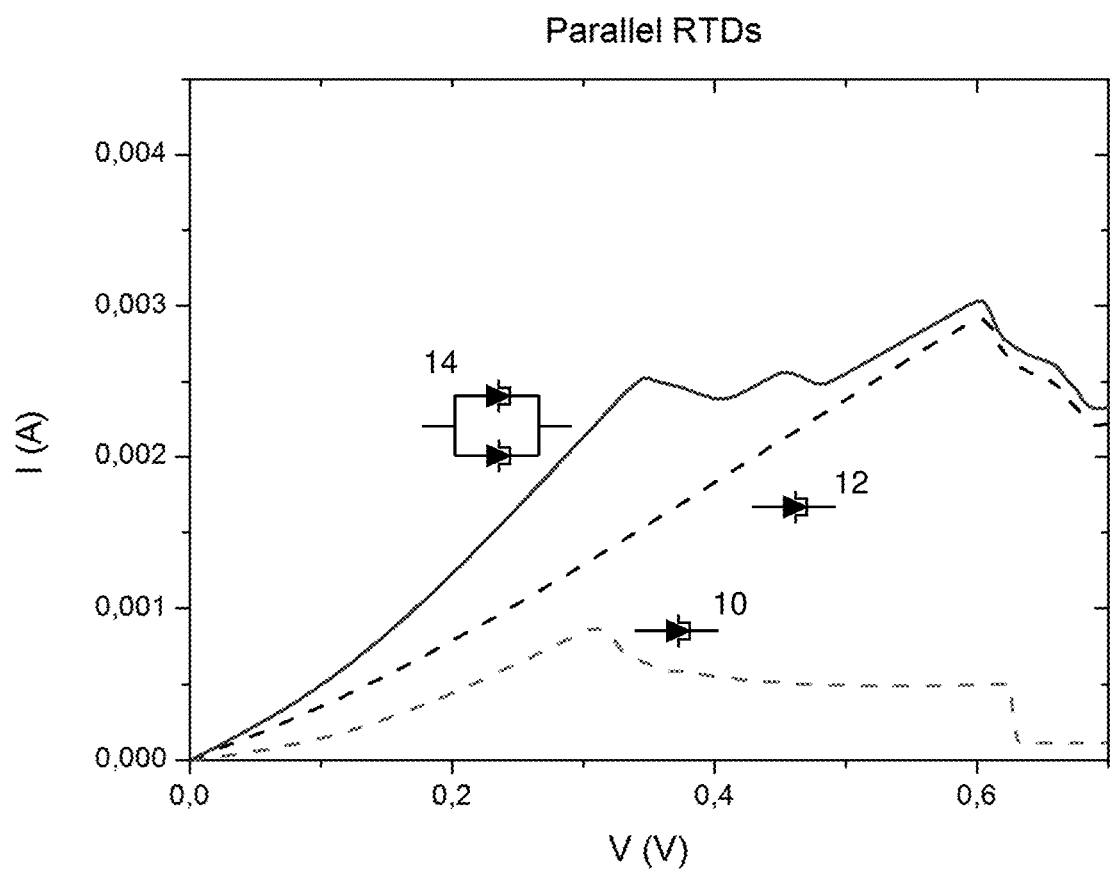

FIG. 2 shows what sort of form the unique responses might take, in particular an input-output voltage-current characteristic. For instance, it can be seen when a particular diode is challenged, a particular input-output characteristic 10 is obtained, in this case, with a particular peak at around 0.3V and a particular drop-off at just above 0.6 volts. In contrast, when another, different particular diode is challenged, its input-output characteristic 12 is quite different, with a particular peak at around 0.6V. When these two different diodes are challenged in combination, and in particular in parallel, a different input-output characteristic 14 is obtained, with numerous peaks between 0.3V and 0.6V. The exact details of the characteristics 10, 12, 14 are not particularly important for discussion here, except from the fact that it can be seen that they are particularly different and particularly unique. Therefore, these unique responses to input challenges can either be a unique identifier for each diode or combination of diodes, or the unique identifier can in some way be derived from these characteristics. This shows how the diodes can form or be a physically unclonable function.

In can already been seen from FIG. 2 that at least with the approach shown, it may not be readily possible to quickly and easily distinguish from, say, a peak in the second characteristic 12 at 0.6V, and a peak in another characteristic 14 at 0.6V. Also, it may be difficult to easily qualify or quantify the numerous different peaks in the other characteristic 14, for use in generating a unique identifier or similar. The overall message, then, is that while the characteristics 10, 12, 14 are unique, and are potentially very powerful in terms of providing unique identifiers, it may nevertheless be quite difficult to quickly, easily, repeatedly or simply practically generate unique identifiers using such characteristics, for example for use in generating a unique identifier or checking against a previously obtained unique identifier.

Figure 3:
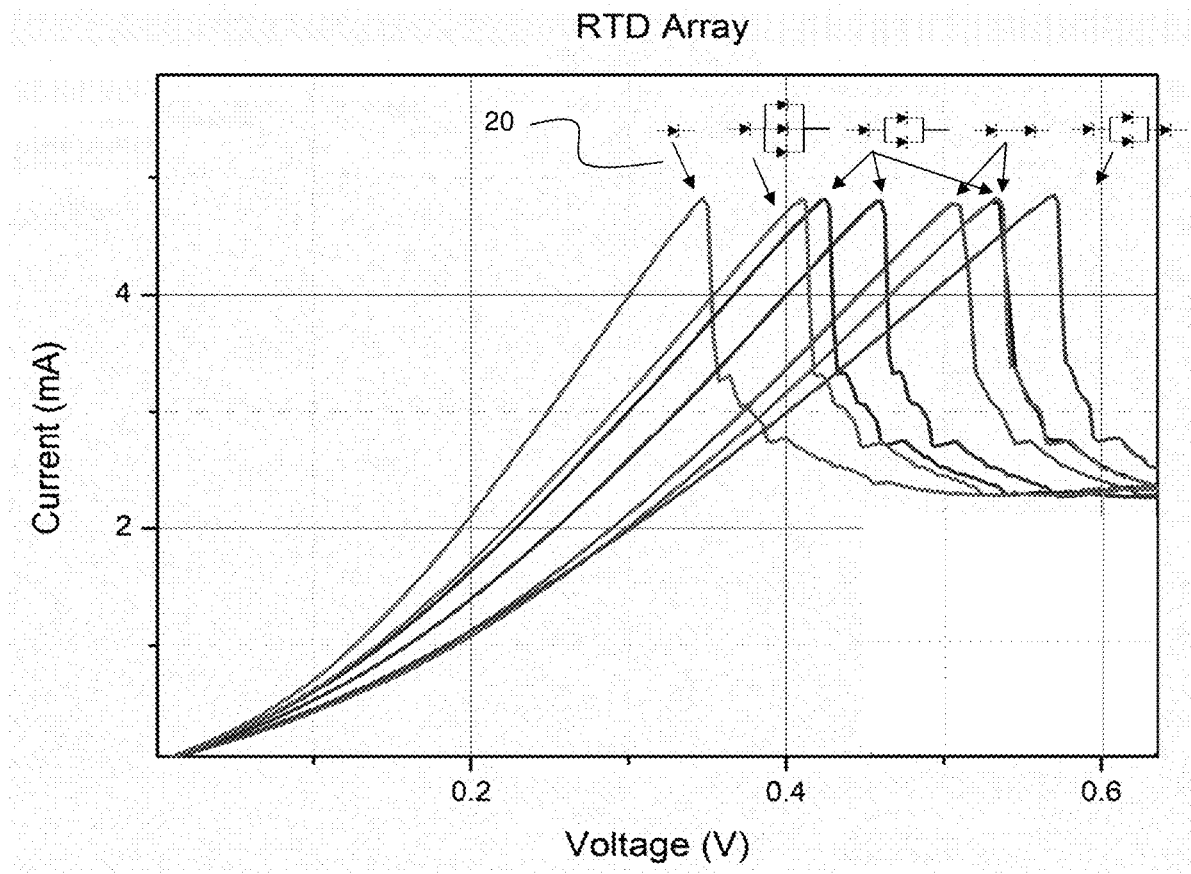

FIG. 3 shows how the problems associated with FIG. 2 are even more pronounced when the number or combination of possible unique identifiers derivable from a device is increased, where it becomes even more difficult to easily, quickly and practically distinguish from a large number of unique characteristics 20 that are derivable from the device in question.

According to aspects of the present invention, it has been realised that one or more problems associated with prior art approaches can be avoided or overcome. This is achieved by using a device (e.g. a physically unclonable function) that comprises a plurality of structures, each structure being able to change from a first distinct state to a second distinct state, in response to an appropriate input challenge. The physically unclonable function may be a device for generating a unique response to a challenge, or form part of that device. The device is arranged to facilitate a challenge of the plurality of structures in combination, by changing an input to the plurality of structures in combination, to cause each structure of the plurality of structures to change from the first distinct state, to the second distinct state. Facilitating, in this context, might mean that the device performs the challenge, or is in some way constructed or fabricated to allow for that challenge to be undertaken. The changes in state (i.e. switches in state) could be from a relatively low conducting state to a relatively high conducting state, or from a non-resonant electrical, mechanical, magnetic or optical state to a respective resonant state, or from an emitting state, to a non-emitting state, and so on. In other words, there is a distinct change or switch in state of the particular structure or structures. As part of the challenge, the device is arranged to facilitate a measurement of an output of the plurality of structures in combination, in response to the input.

Key to the invention is that the unique response is at least indicative of a sequence (e.g. an order) in which the change in state takes place for each of the plurality of structures, in response to the input. That is, the unique response is not solely dictated by measuring or identifying a peak in a characteristic, or a gradient, or a trough, and so on, but is instead about noting or using a sequence in which switching (changing of state) of structures takes place. Effectively, then, the invention relates to a time-resolved measurement procedure (e.g. changing an input sequence), as opposed to a continuous measurement procedure that might be needed to, for example, find a peak in an I-V or V-I characteristics. An output sequence may be far easier to determine and generally process.

Figure 4:
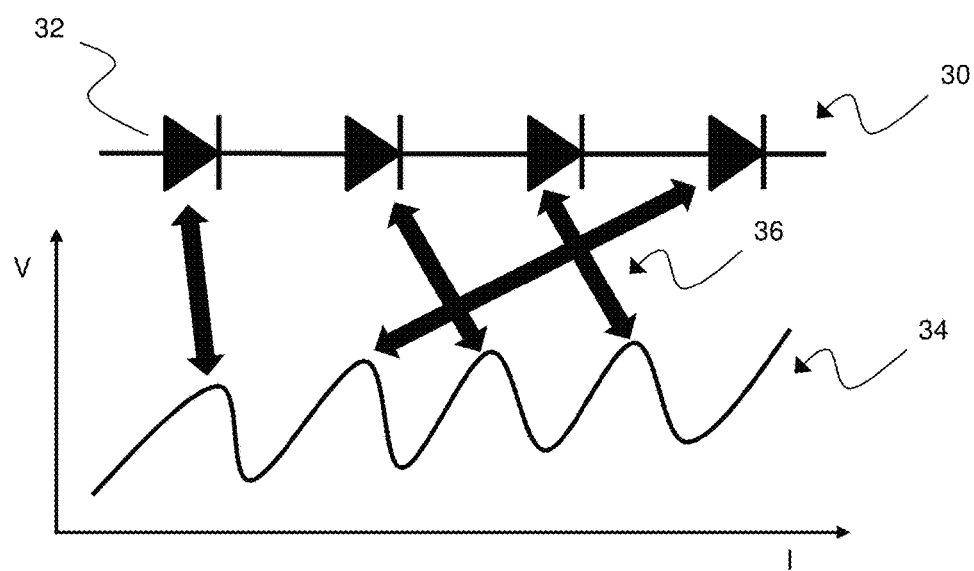

FIG. 4 schematically depicts general operating principles associated with a device according to example embodiments. In this particular example, the device 30 comprises a plurality of (e.g. resonant tunnelling) diodes 32 connected in series. Such diodes, and indeed other types of diodes, exhibit negative differential resistance, and so switch between distinct states of resistance/current flow. Of course, other structures may be used that change from one state to another depending on an input, for example other structures exhibiting negative differential resistance, bistability, and so on.

Referring back to FIG. 4, a challenge-response characteristic is shown in the form of a current-voltage (I-V) characteristic 34. Each peak in the characteristic 34 corresponds to a structure (in this case diode 32) of the device 30 switching from a relatively high to relatively low resistance in order of increasing peak (input) current.

Without having some prior knowledge of the diodes 32, and in particular their individual I-V characteristics, there is no way to tell in what particular order the diodes will switch. This is particularly true when the structures (in this case diodes) are nominally the same, in that they have been fabricated to be identical, for all intents and purposes. In practice, however, due to imperfections at macroscopic, microscopic or even quantum levels, the structures are not identical and will actually switch at slightly different input currents. In the prior art approaches, it was these different peak switching points which could be used as unique responses, for unique identification purposes, but this was sometimes difficult to implement in a practical manner. However, in accordance with example embodiments, the order in which the switching take place for each structure is far more readily determined. Therefore, measuring and determining the order 36 in which each structure 32 switches according to the combined characteristic 34 offers an improved approach to the generation of unique responses to a challenge, and therefore the related generation of a unique identifier, either for establishing that unique identifier, or for cross-checking or authenticating that unique identifier.

When the devices are normally the same, even if there is an expected switching point it will, again, not be possible to determine the exact point until an individual device is challenged. There may also be subtle interplay between the structures which means that if the switching peaks or points are very close together, the actual order of the switching of the structures may not be as expected when challenged in combination, as opposed to when challenged in isolation. All considered then, looking at the switching order of structures in combination may lead to a more practical, and even better approach than with prior art techniques.

The device will typically be fabricated such that a single structure of the plurality of structures cannot be readily challenged in isolation. This is so that the structures cannot be characterised in isolation, which could give an indication of the switching order of a combination of structures. This approach may not be unique to the invention, but may be typical of manufacturing techniques, for example a diode array, where it is simply not possible or easily practical to challenge a very small, isolate diode in amongst the array, or simply electrical components in general, which are often sealed, encapsulate or otherwise generally physically isolated from a surrounding environment.

As discussed above, key to the present invention is that the unique response is at least indicative of a sequence in which the change in states takes place for each of the plurality of structures of the device, in response to the input. This determination of switching sequence or switching order, and its benefits, will now be described in more detail.

Figure 5:
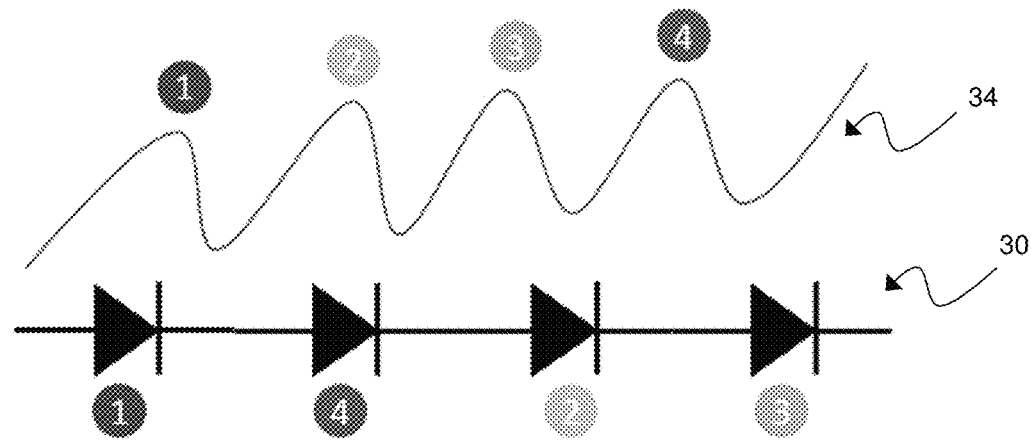

FIG. 5 schematically depicts the same device 30 as discussed above, in combination with the same characteristic 34. Peaks in the characteristic have been labelled 1-4 correspond to each of the four peaks in that characteristic 34, and each structure of the device has also been labelled 1-4, to correspond with the associated peak in the characteristic 34. Very quickly and simply, this shows that the structures of the device 30, when challenged in combination, switch in a particular order with increasing input current. The order may be far easily and simpler to determine and use as, or provide an input to the generation of, a unique identifier, than for example voltage peaks, switching frequencies, measure of capacitances, and so on.

Figure 6:
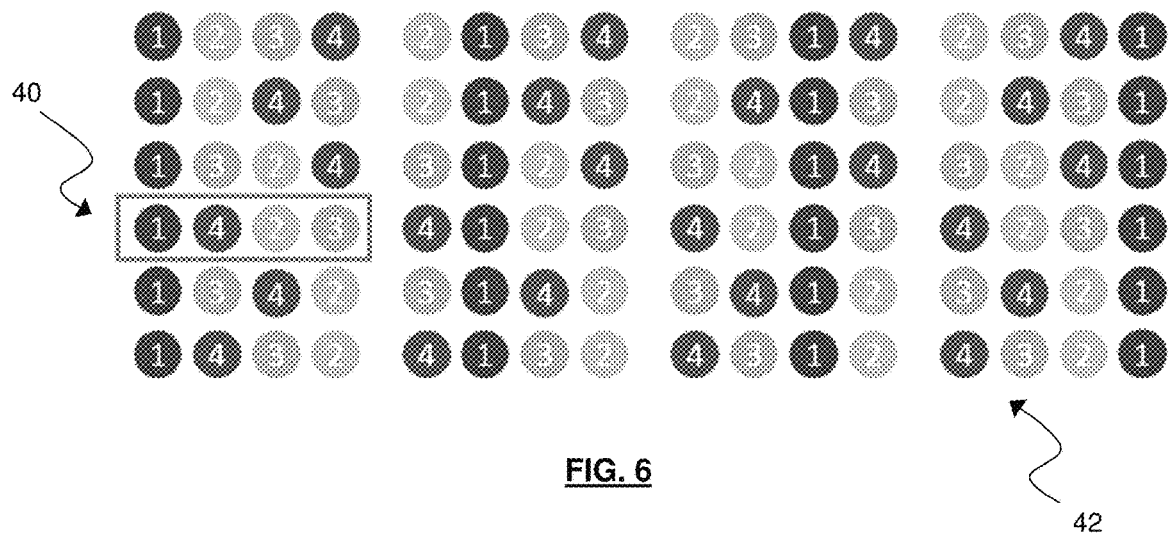

FIG. 6 is closely related to FIG. 5 and shows the number of different combinations of possible switching orders of the diodes of the device of FIG. 5. As shown in FIG. 5, it is already known that the structures of the device switch in a particular order 40, in and amongst the larger number of possible combinations of switching order or sequence 42.

Since four diodes or structures constitute the device, and since there are a related number of peaks in the switching characteristic, there are 4! (4-factorial) possible combinations of switching sequences, if all diodes are challenged in combination. That is, there are 24 possible combinations. Therefore, in order to guess, or clone, or attack by force a device or system utilizing this unique switching order, an attacker or otherwise would have to navigate the 24 possible different combinations 42 in order to be sure that they had arrived at the correct combination 40.

Depending on how the system is implemented, or the combination or unique identifier is to be used, this hurdle or barrier of different combinations itself might provide a practical deterrent to an attacker for even attempting to clone or break the unique identifier. For example, it may simply not be possible to instigate the brute force attack or otherwise when the possible combinations is of a number in the region of 24 or so. That is, the time or resource needed may dissuade or defeat an attacker. However, and as will be explained in more detail below, this not only becomes a deterrent, but a practical impossibility, when the number of possible combinations is extremely high.

FIGS. 3 to 6 already show how the order in which structures switch from a first distinct state to a second distinct state cannot only be used as a useful unique identifier (or an identifier can be derived from that order), but one that can be quite quickly and practically determined. However, the approach brings other advantages, as will now be described.

Figure 7:
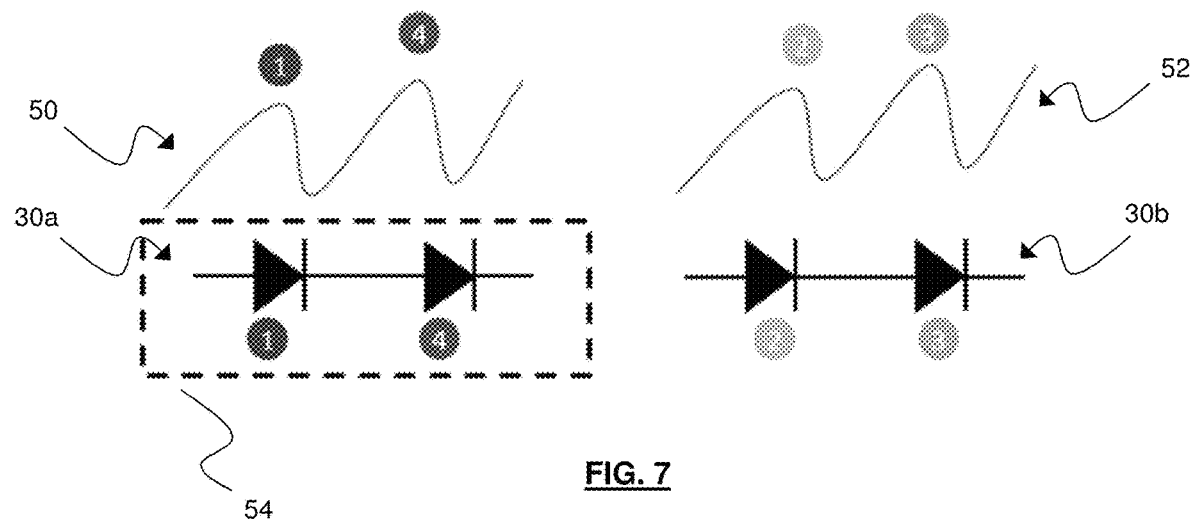

FIG. 7 shows a scenario in which the device described above has, effectively, been split into two parts: a first part 30*a* comprising two of the diodes, and a second part 30*b* comprising the remaining two diodes. Each part 30*a*, 30*b* will have an associated challenge-response, input-output characteristic 50, 52. Again, as above, the peaks in these characteristics are labelled to correspond with the structure associated with that peak.

The device is not split for arbitrary purposes. There are practical benefits. In a prior art approach, a single device or physically unclonable function may itself contain all information necessary to circumvent the unique identifier provided by that device, or to simply obtain the unique identifier provided by that device. According to FIG. 7, by splitting the device, it is made more difficult for a single party to retain both parts 30*a*, 30*b*. Indeed, one part 30*a* of the device may be maintained in a more secure environment 54, and the other part 30*b* may be free to use, for example by a user. A simplistic way of viewing this scenario, and expanded upon further below, is that the part of the device 30*a* located in a secure environment 54 might be part of a computer or other system, likely being the part that facilitates the challenge of the structures. This might be viewed as a lock-like environment or similar. In contrast, the second part 30*b* may be portable, or in the hands of a user, for example being a memory stick, or activation device or similar. While it may be relatively easy to obtain and inspect the second part of the device 30*b*, it may be more difficult or even impossible to readily inspect the first part of the device 30*a* located in the secure environment 54.

In an approach to the generation of unique identifiers that does not involve determining a switching order or sequence, numerous different possibilities arise. For example, looking at the position of peaks in a characteristic. A suggestion is to calculate a statistical average of the peak position and implement a threshold value below which the response is considered 0, and above which the response is considered as 1. In contrast, a benefit of using a switching order is that there is no need for an arbitrary (or empirically determined) threshold to be set, because the structures themselves act as the thresholding element (e.g. by switching). This means that you need both parts of the device (PUF) to get the correct response, because each individual part of the device, including structures within those parts, take part in the "decision" on (i.e. influence) which structure switches first, and the order in general for all structures.

As discussed above, FIG. 7 shows that each particular part 30*a*, 30*b* of the device has a particular input-output characteristic 50, 52. In the first part of the device 30*a*, it can be seen that the first structure switches before the fourth structure. In the second part of the device 30*b*, it can be seen that the second structure switches before the third structure. Therefore, we have a switching sequence 1-4, and, separately, 2-3. Important to understand is that the switching sequence of these devices when combined with one another and challenged in combination is not simply the juxtaposition or bringing together of the switching sequences, i.e. 1-4-2-3. Instead, and as shown in FIGS. 5 and 6, the actual sequence is 1-2-3-4. That is, the overall switching order cannot be known without challenging all structures—i.e. without having access to both device parts in combination.

Figure 8:
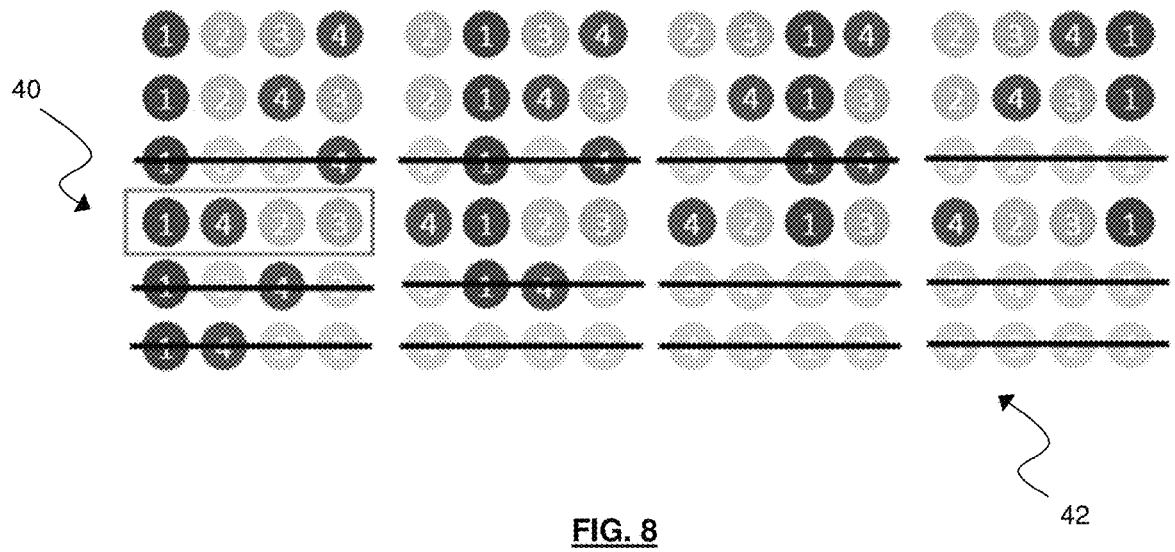

An important point to note is that even if the second part of the device 30*b* is compromised, so that an attacker can determine the switching order of structures in that part of the device 30*b*, it is still not possible to instantly know what the switching order of the combined structure 30*a*, 30*b* will be. Instead, knowledge of the switching order 2-3 of the second part of the device 30*b* simply rules out particular combinations of switching sequences for a would-be attacker, as shown n FIG. 8. In other words, when the switching sequence of one part 30*b* of the device is known, the number of possible combinations that an attacker needs to attempt to overcome the security (unique identification) that the combined device provides is reduced. However, the attacker still needs to try a reduced number of combinations in order to overcome the security—i.e. there is still a degree of security provided, since the attacker does not know in which order the structures of the first part of the device 30*a* switches. FIG. 8 shows that in this scenario, instead of there being 24 possible combinations that need to be attempted, only 12 possible combinations are required. Again, this number of combinations might still be a deterrent or practically insurmountable challenge for an attacker. The attacker might not have the will, time, or resource to overcome the problem these combinations provide. Again, though, this is particularly true when the number of combinations is impractically large, as discussed in further detail below.

Figure 9:
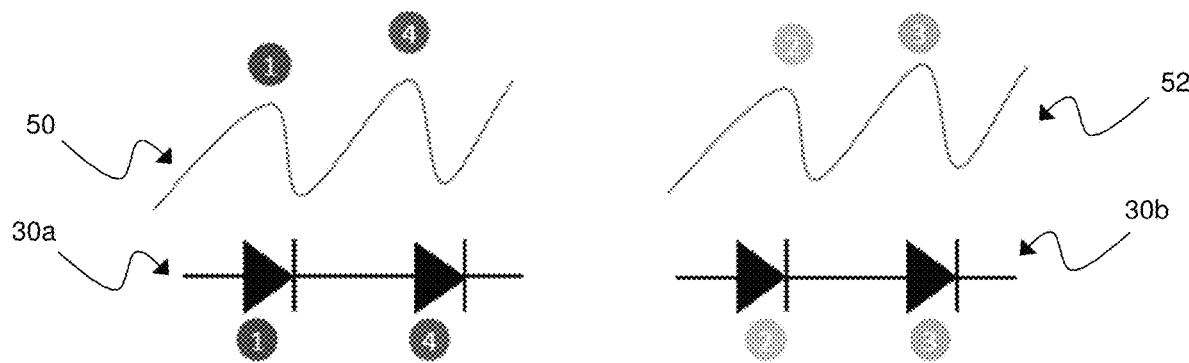
Figure 10:
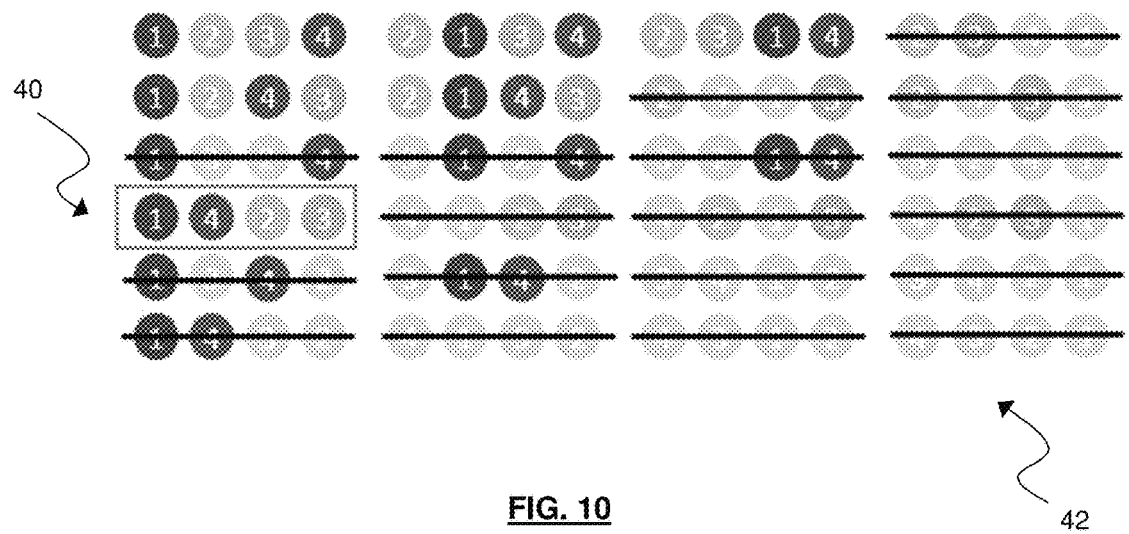

FIGS. 9 and 10 schematically depict much the same situation and scenario as already shown in and as described with reference to FIGS. 7 and 8. However, in FIGS. 9 and 10, the first part of the device 30a is no longer located in a secure environment. This could be in a literal sense, in that the first part of the device 30a is simply not located in an environment in which security is somehow increased. Or, FIG. 9 could represent a scenario where the secure environment has somehow been overcome or circumvented. In any event, FIG. 9 shows that the two parts of the device 30a, 30b have been compromised, so that the switching order of each device in isolation is known. However, the switching order of the device when challenged in combination—that is, when the two parts are connected—is still not known.

FIG. 10 shows that in this scenario, there are still 6 possible combinations of switching order that an attacker would need to attempt in order to be guaranteed of realising the correct switching order 40 (1-4-2-3). This demonstrates that, again, even if both parts of a split device are compromised, for example by the same or different parties, the overall security provided is still not completely circumvented. That is, different combinations of attack still need to be attempted, in whatever manner, in order to achieve or realise the correct switching order. As above, 6 particular combinations could be a sufficient deterrent, in terms of practicalities, for an attacker to attempt to overcome or attempt to simulate or force. However, in perhaps a more practical or realistic approach, where the combinations may be far higher, an attack might be practically impossible, as discussed in further detail below.

Figure 11:
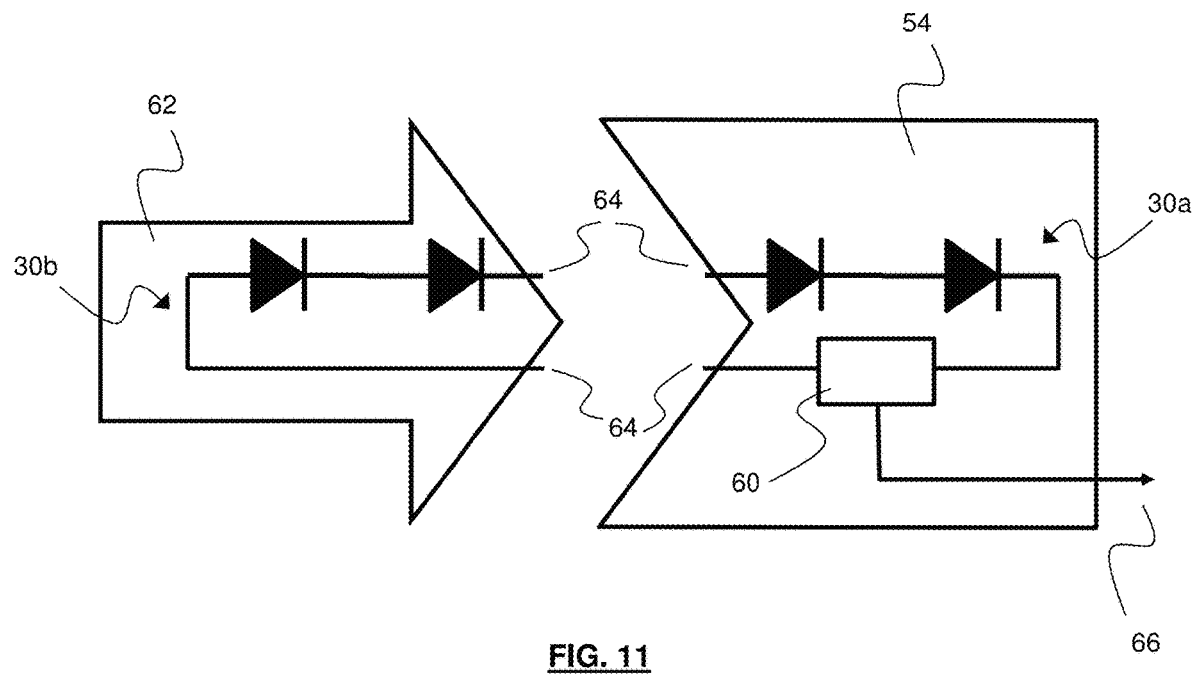
Figure 12:
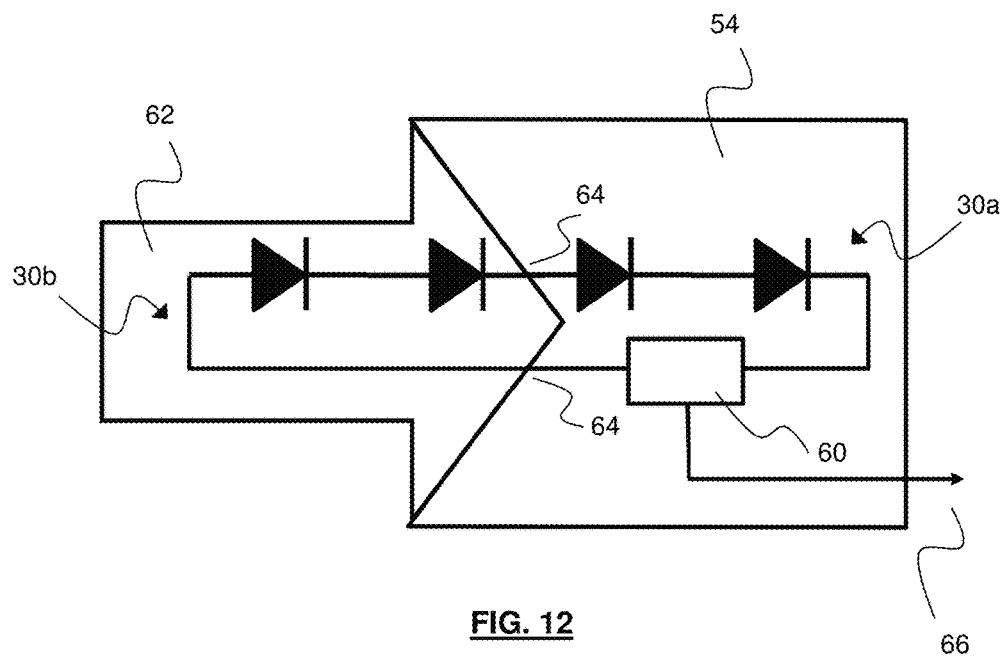

FIGS. 11 and 12 depict expanded and/or more practical implementations or scenarios of the above-described principles. The first part of the device 30a and second part of the device 30b are, again, shown as being separated or split from one another. The first part of the device 30a is located in a secure environment 54. This might be described as a lock or a device comprising such a lock or similar. This secure environment 54 might be a more secure physical environment, for example in terms of it being more difficult to physically access the first part of the device 30a, or may be in some way a more virtual secure environment, in for example it being more difficult to gain access to challenge or response information of the first part of the device 30a. Because the first part of the device 30a is located, or perhaps even locatable, in a more secure environment 54, this means that the first part of the device 30a is better suited to facilitating the measurement of the output of the plurality of the structures (e.g. from both parts of the device 30a, 30b) in response to the input.

Given the more secure location 54, the first part of the device 30a might comprise or at least be in connection with a controller or similar 60 which is arranged to challenge the device in combination 30a, 30b. The controller may provide an output of a determined switching order, or perhaps an output indicative of a check or otherwise relative to that order, for example that the detected order is an expected order or response. This means that the more secure part or side of the device 30a is in a better position for determining whether a detected sequence is an expected sequence, in which the first part 30a and second part 30b are an intended or secure first part 30a and an intended or secure second part 30b, or an unexpected response in which the first and second parts are unintended or unsecure first and second parts. In essence, this is a safer approach in that not only is a part of the device kept more secure in terms of its unique identifier (i.e. switching order) or part thereof, but any processing in relation to the challenge-response, input-output is undertaken on, from or via the more secure side of the device or method.

FIG. 11 shows that the second part of the device 30b might form some sort of key 62 or similar which is engageable with the lock-like portion of the secure side 54 via one or more electrical connectors or similar 64. The connectors 64 allow the first part 30a and second part 30b to be relatively connectable and connected, and disconnected, or put together and separated, or similar. This readily facilitates, or prevents, the combined challenged of the structures of both parts 30s, 30b.

FIG. 12 shows that the key 62 is put in combination with the more secure lock 54 in order for the challenge of the combined structures or parts 30a, 30b to be undertaken by the controller 60. The controller 60 might provide an output 66, as required. As alluded to above, the output 66 could include or be indicative of the detected or determined sequence, or could be an activation signal or pass signal, if the controller 60 determines that the switching order is an expected switching order. In other words, the controller 60 may be aware of a correct order for a given input, if the structures of the first part and second part are as intended. If not, the output can reflect that, or there may be no output, since this may indicate that one or both parts 30a, 30b are not functioning as intended, or are not the parts that were intended or expected.

Although not shown, the controller might include a power (e.g. voltage or current) source for challenging the diodes, or such a power source could be provided separately and be in connection with the controller.

FIGS. 11 and 12 schematically depict a broad and general key-lock arrangement. In a practical sense, this may indeed be a practical implementation where the lock cannot be unlocked or otherwise activated without the correct key. This rather basic principle could be expanded upon as might be expected, where for example the key is a key to a vehicle or device, and the lock is part of that vehicle or device, and the vehicle or device cannot start or be activated unless the correct key is used (i.e. the correct switching sequence is detected). This might also be further expanded upon to systems or assemblies which comprise multiple parts, for example a battery and a connector or a battery and a vehicle. If the component parts, each comprising different parts of the physical unclonable function device, are not as intended, and do not bring about the expected switching sequence, the overall system may not be allowed to function, or may only be allowed to function in a reduced state.

Similarly, each part could form part of a serial number for an object, the serial number only being complete when the parts are together, and the unique identifier generated. That is, the switching order of the combined parts is, or is representative of, a unique serial number. If a part of the device is cloned, then the switching order is changed, and the unique serial number is not realised.

It will be appreciated that a device comprising two parts has been discussed above. More than two parts may be used, of course.

The order in which the structures switch or flip from a first distinct state to a second distinct state may be measured, determined or detected in any one of a number of different ways, depending on the practical implementation of the invention and/or the underpinning structures or technologies.

Figure 13:
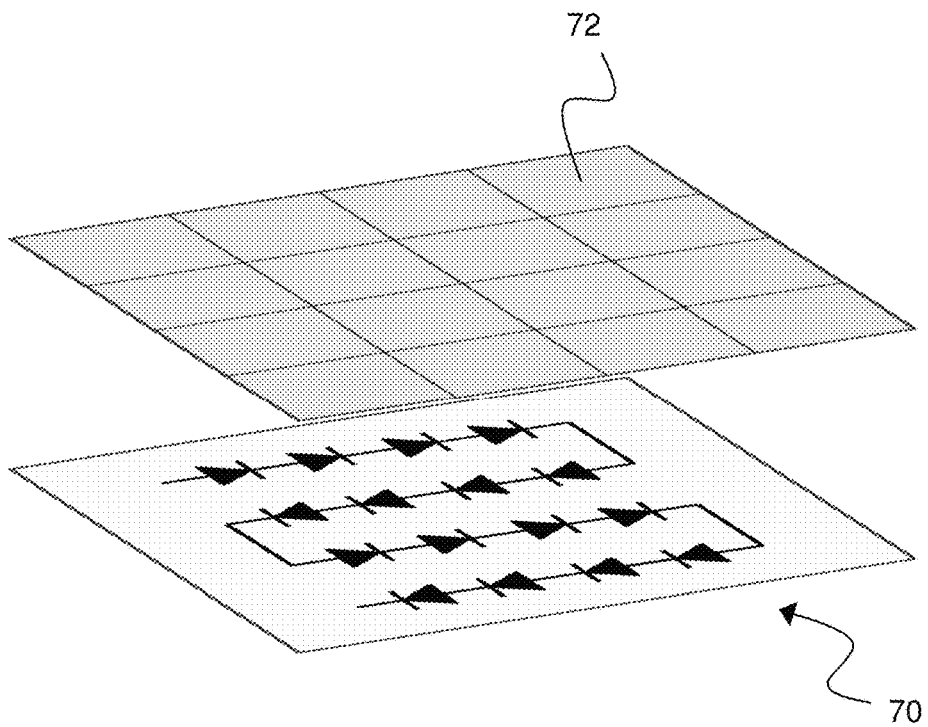

FIG. 13 shows an example where a device according to example embodiments comprises a number of diodes in series 70. In this particular case, the diodes are light-emitting diodes. The order in which the diodes switch may be determined via an optical sensor 72 or optical sensor array. If the structures are always used in combination and made in that way, then the detector 72 may also be made and used in a similar manner, for example as part of the overall device. Alternatively, the detector 72 may be used separately, or even only used or brought into proximity with the array 70 as and when a switching sequence is to be detected or determined. If and when the device is split, as discussed above, into a number of parts, then the detector may also not be a single detector, but may comprise multiple parts, connectable to one another either physically or electrically. Or, the detector may be a single detector, able to detect emission from the diodes 70 when they are located and challenged in combination.

While FIG. 13 has been described in relation to the used of light-emitting diode, optocouplers could be used instead. An optocoupler might comprise an infra-red light-emitting connected to a phototransistor/photodiode, and the response from the structures or device may come as a digital electrical signal (HIGH/LOW) instead of as a lit visible light-emitting diode. In other words, a dedicated or somewhat separate light detector or detector array may not be needed, even though light is still involved indicating the switching of a structure.

Figure 14:
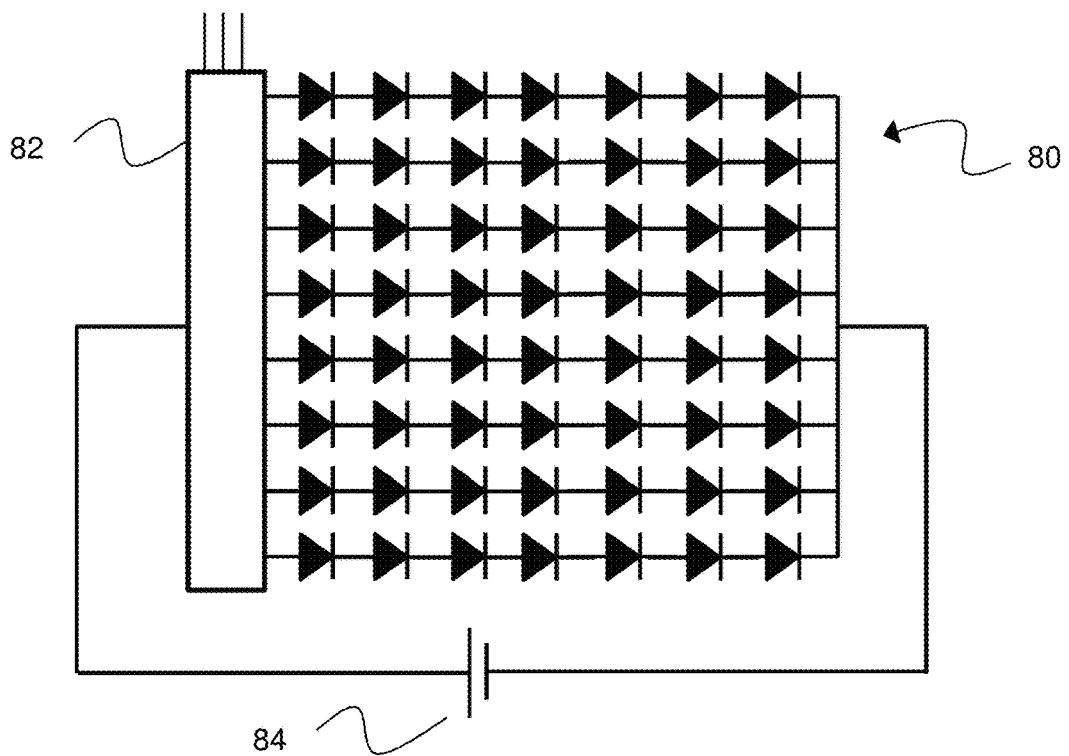

FIG. 14 depicts a different example where there is a parallel array of structures (in this case diodes) 80 arranged in series, a multiplexer or controller 82 and a power source 84. This Figure depicts a number of different principles, which may be understood and used in isolation or combination. One principle is that different combinations of structures (diodes) in the series may be challenged separately by appropriate control of the inputs to the different series of structures, thereby determining different switching sequences, one for each subset of structures of the overall set of structures. In other words, the combination of structures that are challenged in any embodiment does not necessarily need to be the entire number of structures.

Challenging a small subset of the structure will not increase the number of possible combinations (e.g. possible switching sequences). Nevertheless, challenging a subset instead of the whole set can help to prevent attacks in which a nefarious party or attacker can be "eavesdropping" to the communication and trying to mimic it afterwards. This is because, as described herein, knowing the switching sequence of structures for a certain first input does not mean that the switching sequence for a second, different input can derived.

FIG. 14 also depicts or alludes to the fact that the switching order of the structures could be determined in ways other than via optical means. For example, the switching sequence can be determined electrically, for example by a CCD or similar in close proximity to the switchable structures, the CCD detecting switching based on capacitive coupling.

Other electrical approaches to detection are possible, of course. One approach would be to measure the voltage dropped over each structure (e.g. diode) as the voltage across the whole chain or series of diodes is increased or, in general, changed. As the diodes switch they will go to a high resistance state (large voltage drop), for example when the voltage input is increasing. Resources for facilitating the detection might be simple, but will need to scale with the number of structures. Another approach is to use a small (AC) voltage pulse, on top of, for example, an input DC bias that is swept across the device. At every point of high impedance (high resistance) a portion of the AC pulse is reflected back, and correlating the time of arrival of these reflections makes it possible to determine which structure (e.g. diodes) have switched. Resources for facilitating the detection might not be as simple as voltage drop detection, but will, however, not need to scale with the number of structures.

If the structures switch mechanical states, sensing may be via optical means, or perhaps via a mechanical (e.g. frequency, stress or strain) sensor. A magnetic sensor may be used for magnetic structures, and so on.

Embodiments of the invention described so far have been described in relation to a scenario in which the device comprises four structures. If no part of the device is compromised, there are 24 possible combinations for an attacker to guess or force in any attempted attack or circumvention of the unique identifier. This can of course be expanded upon in terms of it being readily possible to increase the number of structures in a practical implementation.

Following on from the principles discussed above, the number of possible combinations ($P_n$) with no prior knowledge of the switching order of any one or more structures of the device is, when all structures (n) are challenged in combination:

$$P_n = n! \tag{1}$$

The number of possible combinations ($V_{n,m}$), if the switching order of a subset (m) of the structures (n) is known is:

$$V_{n,m} = n!/(n-m)! \tag{2}$$

Further still, the number of possible combinations ($C_{n,m}$), assuming that the switching order of both subsets of the device (e.g. both parts of the device) is known, but not the order in combination, is:

$$C_{n,m} = n!/[m! * (n-m)!] \tag{3}$$

The table below gives some numerical examples, expanding on the above principles.

TABLE 1

| n | m | $P_n$ | $V_{n,m}$ | $C_{n,m}$ |
|---|---|---|---|---|
| 6 | 3 | 720 | 120 | 20 |
| 8 | 4 | 40320 | 1680 | 70 |
| 10 | 5 | 3628800 | 30240 | 252 |
| 20 | 10 | $3.4*10^{18}$ | $6.7*10^{11}$ | 184756 |

It can be seen that for even a relatively small number of structures (n=6) there are still twenty possible combinations, even when all switching orders of all subsets of the device are known, but not in combination. Depending on how any attacker might seek to overcome any security or otherwise provided by the unique identifier, this might still be a practically insurmountable hurdle, or at least a deterrent, especially when the attacker does not actually know in advance that the possible combination is only twenty. For instance, the attacker may not know that the possible combinations could be, or is, an order of magnitude higher. An important point to realise is that the attacker will probably realise that there is still another unknown element of the (split) device, and a relatively large number of combinations that need to be attempted, in order to overcome any security that is provided.

Another important principle that the table demonstrates is that it is extremely easy to increase the number of structures by less than an order of magnitude, and yet, due to the factorial relationship, reveal a possible set of combinations which is practically insurmountable. Viewed in a more practical way, if there are 20 structures in the device, and it takes only one microsecond to force or attempt a combination attack, it would still take approximately 770 centuries to attempt all possible combinations. In other words, by using an eminently and easily achievable number of structures, the security provided is practically insurmountable.

As discussed above, the practicalities of using a switching order to generate unique response are beneficial, and yet the security which is provided can be difficult to overcome, and in some instances physically impossible to overcome. This is, at least in part, because of the n-! (n-factorial) relationship. This n! relationship assumes that there is a linear relationship in the switching sequence, in that for example a sweep-up of input values or a sweep-down in input values will lead to a first switching sequence and then a reversed, mirror-image switching sequence. For many structures and related devices, however, this linear relationship is not actually what happens in practice. The behaviour or each structure, and therefore each structure in combination when challenged, is actually non-linear. In other words, each structure, or more than one structure challenged in combination, exhibits non-linear behaviour in terms of an input-output characteristic. This is true of any structure in which different states can be reached with the same input values, or in other words there is perhaps a hysteresis in terms of the inputs and outputs provided to the structure. A good example of this is the negative differential resistance exhibited by certain electrical components, for example certain diodes, as is shown in resonant tunnelling diodes and similar devices. Because of this non-linearity, the number of possible combinations is not necessarily n!, but instead this n! is a lower band or level, and an upper band is actually $(n!)^2$, which vastly increases the number of possible combinations depending on how the device is challenged and the sequence is determined.

Figure 15:
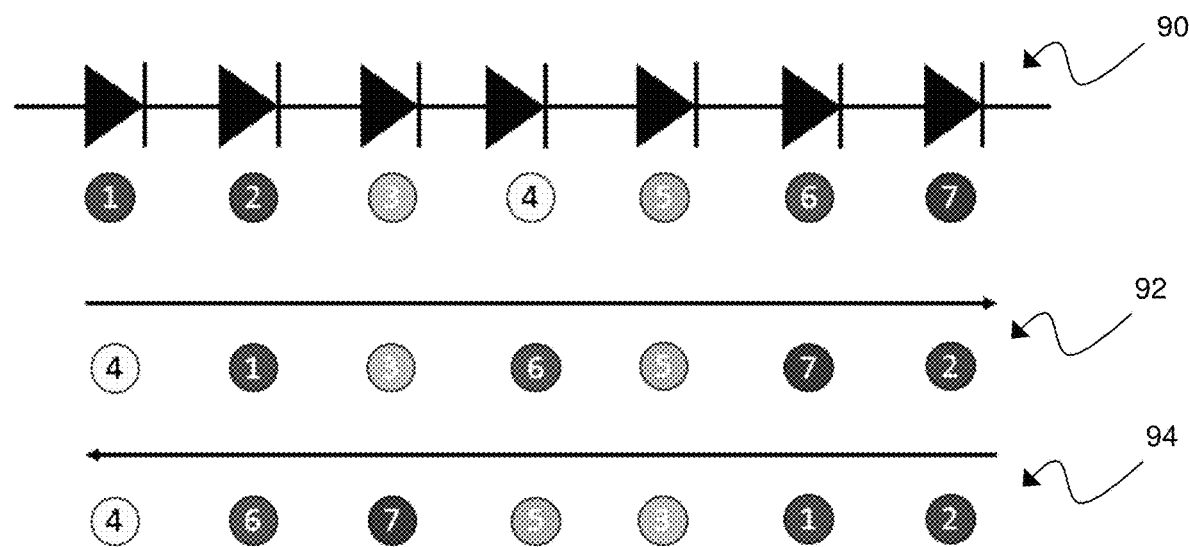

FIG. 15 demonstrates this principle very schematically in that there is a device comprising seven diodes connected in a series 90. When challenged with a ramping up or increasing input sequence there is a first switching order 92 of the structures: 4-1-3-6-5-7-2. However, when this very same input is then ramped back down or reversed, there is then a second different 94 switching sequence 2-1-3-5-7-6-4. In other words, the sequence 92 is not simply the reverse of the sequence 94, again due to non-linearity of the systems and structures in play.

Figure 16:
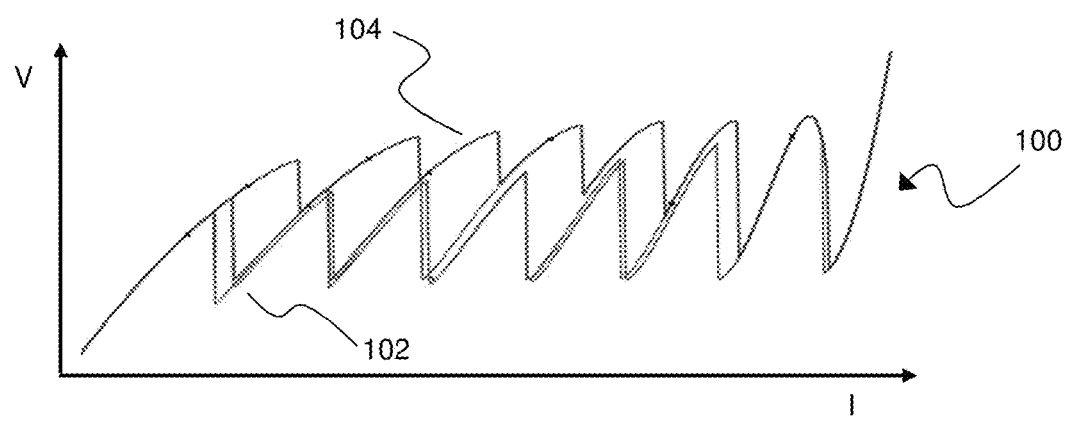
FIG. 16 is a graph schematically depicting reasoning for the non-linear switching principles of FIG. 15.

FIG. 16 schematically depicts a graph that depicts the non-linear behaviour 100 in that an I-V characteristic of the diodes challenged in combination is out of phase in terms of the forward 102 and reverse 104 input sweeps.

It would appear there is a correlation between the peak current (which determines an upward switching order) and the valley current (which determines the downward switching order). If the structures are different enough it is likely that both switching sequences or orders will coincide, which means that the number of combinations will approach the n! relationship discussed further above. If, however, the structures or devices are normally the same or identical, the switching order or sequence going up and going down can be very different due to the interplay between structures and the proximity of their switching peaks or points.

Figure 17:
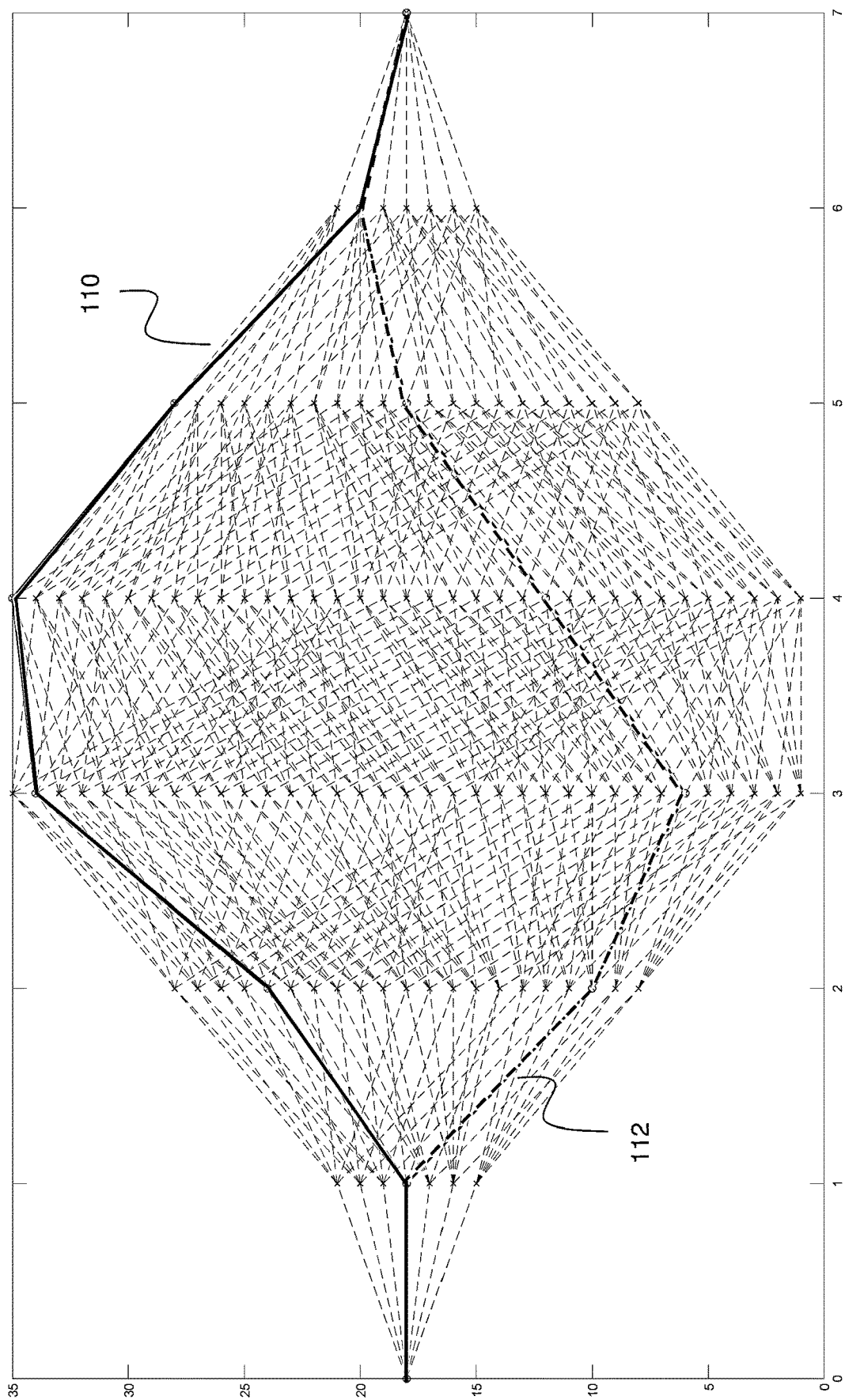
FIGS. 17 and 18 depict further principles associated with the non-linearity of switching orders of structures of a device, according to example embodiments.

FIG. 17 is a plot of all the different combinations of switching sequences that may be obtained using the device of FIG. 15, depending on how the input sequence is increased, and decreased, and to which points the input sequence is increased, and from which point the input sequence is decreased, all due to the non-linearity, hysteresis or history of the device (which terms may all relate to one another and or be interchangeable). Referring to FIG. 17, it can be seen that in a very simple explanation of the plot, the ramp up or upwards switching sequence 110 is very different to the down or reverse input sequence 112.

Figure 18:
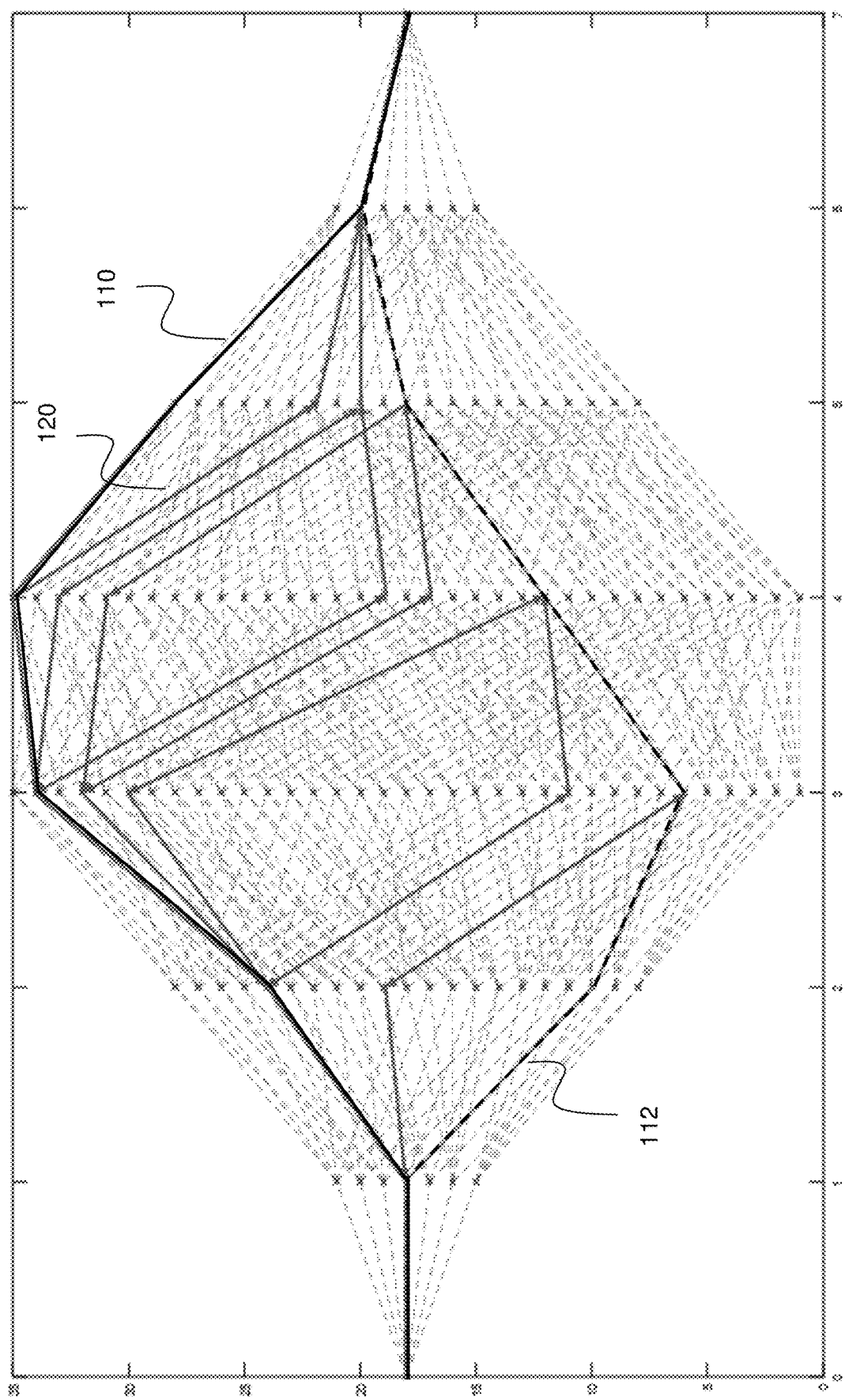

FIG. 18 is the same as FIG. 17, but also shows a plurality of other paths 120 through the number of possible switching states that the device of FIG. 15 can exhibit.

FIGS. 17 and 18 show that the device functions as a state machine. Therefore, it is not just the unique response that is important, but the input, since different inputs result in different (albeit repeatable) sequences. This further complicates and provides hurdles for any attack on the device. They cannot challenge with an arbitrary input to obtain a/the sole single switching order output. From another perspective, an authentication might take place with different inputs, or with different structures, to obtain different, repeatable outputs to check, or double-check or more, that the device (or parts thereof) is (or are) as intended or expected.

The non-linearity described above might be alternatively or additionally defined as being a behaviour such that a change in an input according to a first sequence, from a first level to a second level, results in a first sequence in which the change in state of the structures takes place for each of the plurality of structures, in response to the input, and such that the change in input according to a second input sequence, back down from that second value to that first value, results in a second, different sequence in which the change in states takes place for each of the plurality of structures in response to the input. That is, the second sequence is not simply a reverse of the first sequence. For example, as an input sequence changes from 0.5V to 1.5V to 2.5V to 3.5V to 4.5V we might have structures of the device switching in the order 1-2-3-4-5. However, when the input sequence is reversed and changed down from 4.5V to 3.5V to 2.5V to 1.5V to 0.5V, the diodes do not switch in the opposite direction or simply in the reverse order. For example, the devices might switch in the order of 4-1-3-2-0. In other words, an attacker needs to know not only what order might be unique, but what order is unique for a particular input.

Due to the inbuilt non-linearity (e.g. hysteresis or history or similar) it is not simply the input value or level that defines the state in which the structure or combination of structures is in. The non-linearity and therefore history also plays a part. In other words, the non-linear behaviour is such that a change in an input according to a first sequence from a first level to a second level to a third level results in a first sequence in which the change in state takes place for each of the plurality of structures in response to that input, and such that a change in an input according to a second input sequence from the same first level to a (different) fourth level, to the same third level, results in a second, different sequence in which the change in state takes place for each of the plurality of structures, in response to the input. Again, then, for the same array of structures, an input sequence of 0.5V, 3.5V, 2.5V can give a different response (and therefore switching sequence) to that of an input sequence of 0.5V, 1.5V, 2.5V, and this is in light of the fact that the structures are the same, connected in the same way, and the starting and ending voltages in each challenge are the same.

It is worth noting that the above, discrete, input voltage sequences also show how a switching order (as opposed to peak/trough) identification is easier, in that there is no need to make voltage sweeps/ramps, and implemented related control or detection. Specific/discrete voltage levels can be used.

All considered then, the important point is that the non-linearity is not something that is created, but is an inherent part of a system which is taken advantage of to increase the number of possible combinations or switching orders, and therefore the uniqueness of the unique identifier and the security it provides. This leads to a related increase in difficulty required to simulate, attack, circumvent or force the unique identifier or the security it provides.

In all examples so far, the unique identifier has been described as being the switching order, or something related to that switching order, for example data or a value that is someway related to or seeded by that switching order. However, the switching order could be supplemented by something else, so that the unique response is also at least indicative of another property of an input-output characteristic of a structure, or more than one structure challenged in combination, which is other than the sequence in which the change in state takes place for each of the plurality of structures, in response to the input. This second tier of security information or unique identification may be useful in simply providing further depth or richness to the unique identifier and the security it provides, or a fail-safe, e.g. if the switching sequence is obtained. For instance, and especially when the number of possible combinations is relatively low, an attacker may circumvent the switching order, simply by brute forcing a combination of switching orders, or switching numbers, to a device or system that is to be gained access to by force. However, if the unique response also contains information or a second check based on other aspects of the characteristic, for example a part of a shape of an input-output characteristic of a structure, or more structures, of the device, this will be far harder to overcome by a would-be attacker. For instance, in addition to the switching order, perhaps the value of one or more peaks or troughs of a single or combined input-output characteristic could be obtained, or a gradient of one or more portions of those characteristics, and so on. For instance, an attacker might know or be able to guess or attempt combinations that the switching order is 1-4-2-3 of structures of the device, but the attacker may have no way of knowing, or being able to easily or quickly determine, the fact that the first diode switches at 0.6V, and the last diodes switches at 0.7V, by way of example.

The remaining FIGS. 19-21 depict more general principles associated with the present invention.

FIG. 19 shows a device 130 for generating a unique response to a challenge. The device 130 comprises a plurality of structures, each structure being able to change from a first distinct state to a second distinct state in response to an appropriate input challenge.

The device 130 is arranged to facilitate a challenge of the plurality of structures in combination, by changing an input to the plurality of structures in combination, to cause each structure of the plurality of structures to change from the first distinct state, to the second distinct state. As part of the challenge, the device 130 is arranged to facilitate a measurement of an output of the plurality of structures in combination, in response to the input. The unique response is at least indicative of a sequence in which the change in states takes place for each of the plurality of structures, in response to the input.

The device 130 might be in connection with, or comprise, a controller 132 for, for example, undertaking one or more of a challenge of the plurality of structures as described above, a measurement of the output of the challenge, or to check that a determined switching sequence is an expected (or otherwise) switching sequence. A power supply (or other driver, for changing state of the structures—not shown) may be provided, as part of the controller, or controller by the controller.

FIG. 20 is much the same as shown in and described with reference to FIG. 19, but where the device comprising the structures is formed of two parts 130a, 130b, which are readily connectable to one another, and separable from one another, for example to form the lock-key-like system as described above, or similar.

FIG. 21 schematically depicts general methodology associated with example embodiments. The method is for generating a unique response to a challenge, the response being, or being used to provide a unique identifier. The method comprises challenging a plurality of structures in combination by changing an input to the plurality of structures in combination, to cause each structure of the plurality of structures to change from a first distinct state to a second distinct state 140. As part of the challenge, the method comprises measuring an output of the plurality of structures in combination, in response to the input 142. The unique response is at least indicative of a sequence in which the change in state takes place for each of the plurality of structures, in response to the input. This may be part of the measurement step, or may be a closely related processing step.

It will be appreciated that changes in electrical state, and use of electrical components or structures, is not essential. While the use of electrical components and challenge-response characterisation in an electrical manner may be advantageous, for example in terms of the structures and required processing being able to be undertaken and implemented relatively easily and cheaply, and in a practical manner, other structures and processes are possible. For example, any structure which exhibits distinct changes in mechanical states (e.g. interconnected pendulums, pneumatic valves, elastic or inelastic components), or optical states (e.g. lasing or non-lasing cavities), or magnetic states (relatively non-magnetic to magnetic) may be used. However, it is generally thought that the use of electrical components would be relatively simple and straight forward in comparison with mechanical, optical, or magnetic approaches.

Any ensemble of electronic or electrical devices showing (e.g. N-shaped) negative differential resistance may exhibit the advantageous non-linearity discussed above. This includes RTDs, Esaki diodes, Lambda diodes, Gunn Diodes, fluorescent lamps and some vacuum valves. Of course, some of these examples are more practical than others. Even if nominally identical when made, it is the variability in the fabrication that makes them switch in a specific order, and therefore being useable as discussed herein.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A device for generating a unique response to a challenge, the device comprising:
   a plurality of structures, each structure configured to change from a first distinct state to a second distinct state in response to an appropriate input challenge;
   the device being arranged to facilitate a challenge of the plurality of structures in combination, by changing an input to the plurality of structure in combination, to cause each structure of the plurality of structures to change from the first distinct state to the second distinct state, wherein the device includes:
      a first part including less than all of the structures, and
      a second part including a remaining number of the structures,
   wherein the first part and the second part are connectable and separable to selectively assemble or disassemble the device, allowing structures from the first and second parts of the device to be challenged in combination, or to prevent such a combined challenge, and wherein, as part of the challenge, the device is arranged to facilitate a measurement of an output of the plurality of structures in combination, in response to the input;
   wherein the unique response is at least indicative of a sequence in which the change in state takes place for each of the plurality of structures, in response to the input.

2. The device of claim 1, wherein each structure, or more than one structure challenged in combination, exhibits non-linear behavior in terms of an input-output characteristic.

3. The device of claim 2, wherein the non-linear behavior is such that a change in an input according to the first input sequence, from a first level to a second level, results in a first sequence in which the change in state takes place for each of the plurality of structures, in response to the input; and;
   such that a change in an input according to a second input sequence, back down from the second value to that first value, results in a second, different sequence in which the change in statue takes place for each of the plurality of structure, in response to the input, and in which the second sequence is not a reverse of the first sequence.

4. The device of claim 2, wherein the non-linear behavior is such that a change in an input according to a first input sequence, from a first level, to a second level, to a third level, results in a first sequence in which the change in state takes place for each of the plurality of structures, in response to the input; and
   such that a change in an input according to a second input sequence, from the same first level, to a fourth level, to the same third level, results in a second, different sequence in which the change in state takes place for each of the plurality of structures, in response to the input.

5. The device of claim 1, wherein the structures are nominally the same.

6. The device of claim 1, wherein the device is fabricated such that a single structure of the plurality of structures cannot be readily challenged in isolation.

7. The device of claim 1, wherein the unique response is also at least indicative of another property of an input-output characteristic of a structure, or more than one structure challenged in combination, other than the sequence in which the change in state takes place for each of the plurality of structures, in response to the input.

8. The device of claim 1, wherein the device is arranged to facilitate a challenge of all structures in combination, or a selectable sub-set of the structures in combination.

9. The device of claim 1, wherein the first part is located in a secure environment, relative to the location of, or the ability to locate, the second part of the device.

10. The device of claim 1, wherein the first part of the device is arranged to facilitate the measurement of the output of the plurality of structures in combination, in response to the input.

11. The device of claim 1, wherein the first part of the device is arranged to facilitate a check of whether the sequence in which the change in state takes place for each of the plurality of structures, in response to the input is an expected sequence.

12. The device of claim 11, wherein the expected sequence is when the first part and the second part are an intended or secure first part, and an intended or secure second part, and an unexpected response is when the first part and the second part are an unintended or unsecure first part, or an unintended or unsecure second part.

13. The device of claim 1, wherein each structure is:
   an electrical component, to be challenged with an input and provide an electrical output in response to that challenge, optionally exhibiting negative differential resistance, optionally comprising a diode; or
   an optical component, to be challenged with an input and provide an optical output in response to that challenge; or
   a magnetic component, to be challenged with an input and provide a magnetic output in response to that challenge; or
   a mechanical component, to be challenged with an input and provide a mechanical output in response to that challenge.

14. A method for generating a unique response to a challenge, the method comprising:
   challenging a plurality of structures of a device in combination, by changing an input to the plurality of structures in combination, to cause each structure of the plurality of structures to change from a first distinct state to a second distinct state, wherein the device includes:
      a first part including less than all of the structures, and
      a second part including a remaining number of the structures, wherein the first part and the second part are connectable and separable to selectively assemble or disassemble the device, allowing structures from the first and second parts of the device to be challenged in combination, or to prevent such a combined challenge;

as part of the challenge, measuring an output of the plurality of structures in combination, in response to the input;

wherein the unique response is at least indicative of a sequence in which the change in state takes place for each of the plurality of structures, in response to the input.

15. The device of claim 1, wherein another property is at least indicative of a part of a shape of an input-output characteristic for a structure, or more than one structure challenged in combination.

16. The device of claim 2, wherein the input-output characteristic includes a change in an input sequence versus a change in a sequence in which the change in state takes place for each of the plurality of structures, in response to the input.

* * * * *